(12) United States Patent
Wang et al.

(10) Patent No.: US 10,922,401 B2
(45) Date of Patent: Feb. 16, 2021

(54) DELEGATED AUTHORIZATION WITH MULTI-FACTOR AUTHENTICATION

(71) Applicant: Pivotal Software, Inc., San Francisco, CA (US)

(72) Inventors: Tian Wang, Hercules, CA (US); Sree Lekha Tummidi, Fremont, CA (US)

(73) Assignee: Pivotal Software, Inc., San Francisco, CA (US)

( * ) Notice: Subject to any disclaimer, the term of this patent is extended or adjusted under 35 U.S.C. 154(b) by 211 days.

(21) Appl. No.: 15/956,358

(22) Filed: Apr. 18, 2018

(65) Prior Publication Data
US 2019/0325129 A1 Oct. 24, 2019

(51) Int. Cl.
*G06F 21/40* (2013.01)
*G06F 21/60* (2013.01)
(Continued)

(52) U.S. Cl.
CPC .............. *G06F 21/40* (2013.01); *G06F 9/54* (2013.01); *G06F 21/604* (2013.01);
(Continued)

(58) Field of Classification Search
CPC .... G06F 21/40; G06F 21/604; G06F 21/6209; G06F 9/54; H04L 2463/082; H04L 63/101; H04L 63/10
See application file for complete search history.

(56) References Cited

U.S. PATENT DOCUMENTS

| 2014/0143836 A1* | 5/2014 | Fletcher .................. G06F 21/10 726/4 |
| 2014/0189799 A1 | 7/2014 | Lu |

(Continued)

OTHER PUBLICATIONS

Giada Sciarretta • Roberto Carbone • Silvio Ranise; A delegated authorization solution for smart-city mobile applications; 2016 IEEE 2nd International Forum on Research and Technologies for Society and Industry Leveraging a better tomorrow (RTSI) (pp. 1-6); (Year: 2016).*

(Continued)

*Primary Examiner* — Luu T Pham
*Assistant Examiner* — Chao Wang
(74) *Attorney, Agent, or Firm* — Fish & Richardson P.C.

(57) ABSTRACT

Methods, systems, and apparatus, including computer programs encoded on computer storage media, for performing delegated authorization, including: maintaining resources associated with a resource owner; receiving an access request from a client application requesting access to the resources; performing a first authentication of the resource owner; determining that the first authentication was successful, and providing to the resource owner a request to delegate access to the resources to the client application; receiving a selection of one or more delegated access permissions for the one or more resources to be delegated to the client application; determining that at least one of the one or more delegated access permissions is for a critical resource, and performing a second authentication by requesting multi-factor credentials from the resource owner; authenticating the multi-factor credentials; determining that the second authentication was successful; and granting an access token to the client application permitting access the critical resource.

16 Claims, 3 Drawing Sheets

(51) Int. Cl.
  *H04L 29/06* (2006.01)
  *G06F 21/62* (2013.01)
  *G06F 9/54* (2006.01)
(52) U.S. Cl.
  CPC ........ *G06F 21/6209* (2013.01); *H04L 63/101* (2013.01); *H04L 63/102* (2013.01); *H04L 2463/082* (2013.01)

(56) References Cited

U.S. PATENT DOCUMENTS

| | | | |
|---|---|---|---|
| 2016/0028737 A1* | 1/2016 | Srinivasan | H04L 63/0807 726/1 |
| 2016/0381021 A1* | 12/2016 | Moore | H04L 63/20 726/1 |
| 2018/0191818 A1* | 7/2018 | Maddali | H04L 47/125 |
| 2018/0288617 A1* | 10/2018 | Robison | H04L 67/12 |

OTHER PUBLICATIONS

L. Pearlman • V. Welch • I. Foster • C. Kesselman • S. Tuecke; A community authorization service for group collaboration; Proceedings Third International Workshop on Policies for Distributed Systems and Networks (pp. 50-59); (Year: 2002).*

Manoj V. Thomas • K. Chandra Sekaran; An Access Control Model for Cloud Computing Environments; 2013 2nd International Conference on Advanced Computing, Networking and Security (pp. 226-231); (Year: 2013).*

Hawkes et al., "Dynamic Authorization for IoT," oneM2M Technical Report; oneM2M-TR-0019-V-2.0.0. Sections 5.5.5-3.1.3; Dec. 7, 2016, 72 pages.

International Telecommunication Union, "Draft ITU-T X.te, Trust Elevation Protocol—Authentication Step-Up Protocol and Metadata Version 1.0 (for consent)," ITU-T Draft; Series SG17-TD1074-R2, Study Period 2017-2020, Study Group 17, Geneva, Mar. 20-29, 2018, 27 pages.

PCT International Search Report and Written Opinion issued in International Application No. PCT/US2019/027872 dated Jul. 2, 2019, 17 pages.

Tschofenig et al., "Authentication and Authorization for Contstrained Environments Using OAuth and UMA; draft-maler-ace-oauth-uma-00.txt," Network Working Group; Internet Draft; Internet Engineering Task Force, Mar. 3, 2015, 22 pages.

Barnes and Lepinski, "The OAuth Security Model for Delegated Authorization," (Jul. 2009) [online] [Retrieved on Apr. 5, 2018]; Retrieved from Internet URL: https://tools.ietf.org/id/draft-barnes-oauth-model-01.html, 12 pages.

Hardt, "The OAuth 2.0 Authorization Framework," (Oct. 2012) [online] [Retrieved on Apr. 5, 2018]; Retrieved from the Internet URL: https://tools.ietf.org/html/rfc6749, 76 pages.

"Multi-factor authentication—from Wikipedia, the free encyclopedia," [online] [Retrieved on Apr. 5, 2018]; Retrieved from the Internet URL: https://en.wikipedia.org/wiki/Multi-factor_authentication, 9 pages.

"OAuth—from Wikipedia, the free encyclopedia," [online] [Retrieved on Apr. 5, 2018]; Retrieved from the Internet URL: https://en.wikipedia.org/wiki/OAuth, 8 pages.

"User Authentication with OAuth 2.0," [online] [Retrieved on Apr. 5, 2018]; Retrieved from the Internet URL: https://oauth.net/articles/authentication/, 6 pages.

PCT International Preliminary Report on Patentability in International Appin. No. PCT/US2019/027872, dated Oct. 20, 2020, 9 pages.

* cited by examiner

DELEGATED AUTHORIZATION WITH MULTI-FACTOR AUTHENTICATION

BACKGROUND

This specification relates to authentication techniques in a distributed computing environment.

Delegated authorization is a technique by which an owner of resources maintained in a computer system can delegate, to a software application, access to those resources. This allows the application to access the resources directly, but without allowing the client application to fully impersonate the user. In a common scenario, a user account authentication (UAA) server can issue access tokens to the application that the resource owner has given permission to. The application can then use the access tokens to access the resources on behalf of the resource owner.

Multi-factor authentication is a technique for authenticating a user based on two or more pieces of evidence. For example, two pieces of such evidence can include a password supplied by the user and the physical possession of an object by the user.

SUMMARY

This specification describes a technology that provides support for performing multi-factor authentication in a delegated authorization security model. The technology provides resource owners with greater control over third-party access to critical resources.

Particular embodiments of the subject matter described in this specification can be implemented to realize one or more advantages. Resource owners can fine-tune the level of authorization delegated to client applications seeking to access critical and non-critical resources. Resource owners choosing to access components of an application seeking to access critical resources are mandated by policy to provide additional evidence of their identity, resulting in improved system security. Resource owners can determine that they do not wish to access components of the client application seeking access to critical resources and delegate only access to non-critical resources, which allows for improved operational efficiency. Furthermore, resource owners can be alerted to unauthorized attempts to access critical resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
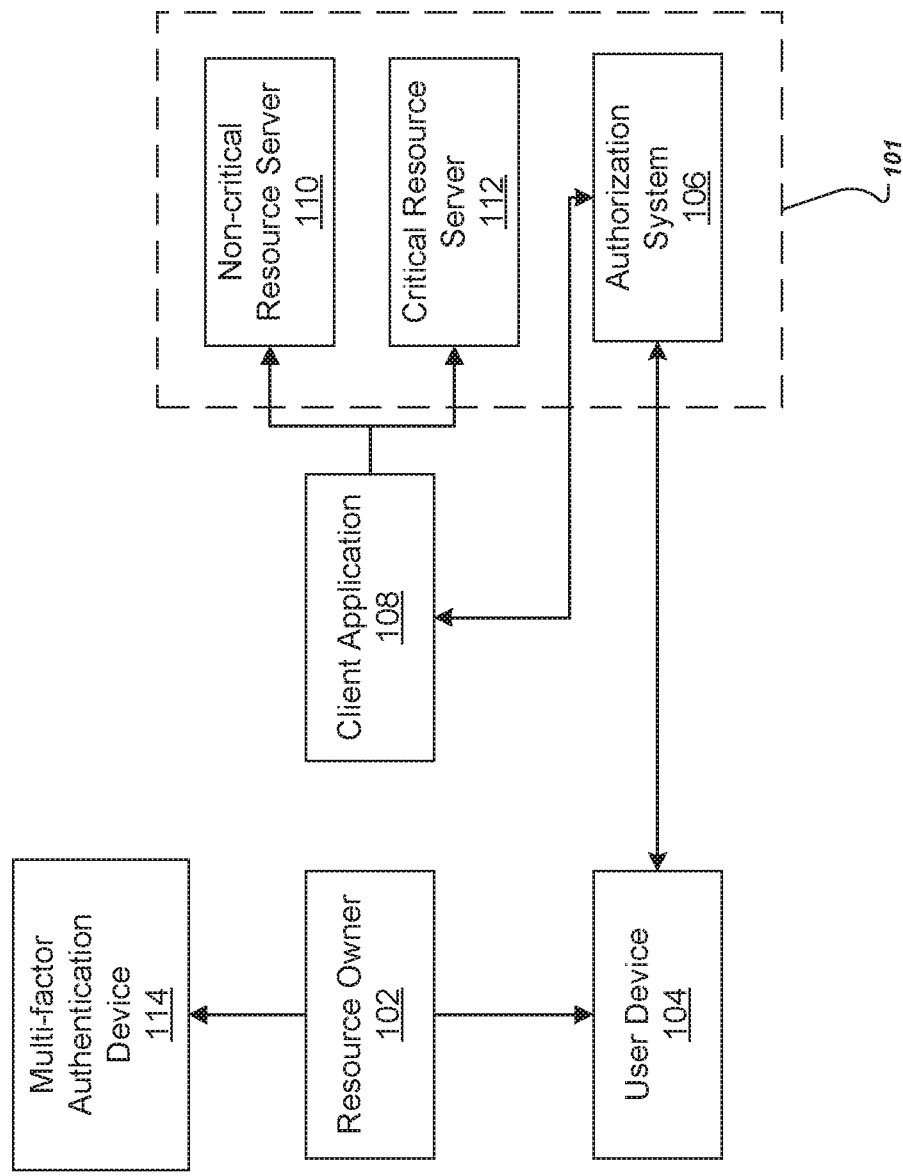
FIG. 1 is a block diagram of an example distributed computing system for implementing multi-factor authentication with delegated authorization.

FIG. 1 is a block diagram of an example system 100 for implementing multi-factor authentication with delegated authorization.

A resource owner 102 owns and controls access to a set of resources maintained in a distributed computing system 101. The resource owner 102 is typically a person, although in some situations, the resource owner 102 can be a software agent. Typically, the resource owner provides the maintained resources to the distributed computing system 101, directs their creation within the system 101, or some combination of these.

A client application 108 is a software application seeking access to resources on behalf of the resource owner 102 using delegated authorization. The client application 108 can be any appropriate application configured to communicate with the distributed computing system 101, e.g., using one or more application programming interfaces (APIs). The client application 108 itself may or may not be created by or hosted by the entity that maintains the distributed computing system 101. The client application 108 can be installed on any appropriate computing device, including the user device 104, the multi-factor authentication device 114, or another computing device. The distributed computing system 101 can be any appropriate distributed system that hosts access to resources owned by resource owners. Each component of the distributed computing system 101 can be implemented on one or more computers, each computer including one or more processors. In this example, the distributed computing system has a critical resource server 112 that hosts critical resources, and a non-critical resource server 110 that hosts non-critical resources. Although different servers are illustrated as hosting critical and non-critical resources, any appropriate number of servers can be used to host any combination of such resources.

For example, the distributed computing system 101 can be a system supporting a social networking platform, the resource owner 102 can be a registered user of the social networking platform, and the client application 108 can be a gaming application that attempts to access the registered user's information stored on the social networking platform. In another example, distributed computing system 101 can be a photo hosting service, and the client application 108 can be a user-built application that accesses photos hosted by the distributed computing system. In either example, the non-critical resources can include public information, such as the registered user's public photos, public posts, username, social connection graphs, etc., and the critical resources can include private information, such as the registered user's private photos, private posts, private relationship status, etc. As another example, the distributed computing system can be a cloud application platform that hosts user-provided applications. In this example, the non-critical resources hosted by the cloud application platform are services that provide access to applications hosted on the platform, while the critical resources can be underlying computing resources, e.g., physical computing nodes and virtual machines. An example of such a cloud application platform is an installation of Pivotal Cloud Foundry available from Pivotal Software in San Francisco, Calif.

The distributed computing system 101 can use an authorization system 106 to support delegated authorization. In a delegated authorization mode, data ownership and data access permissions are separated. For example, the client application 108 does not directly access the resource owner's 102 system credentials, such as the resource owner's 102 username or password (data ownership); instead, the client application 108 can send an access request to an authorization system 106, which communicates with the resource owner 102 to approve or deny the request (data access permission). For example, the authorization system 106 can be configured to provide an identity management service, e.g., a delegated authorization service, such as an OAuth 2.0 provider as specified in the OAuth 2.0 Authorization Framework as published by Internet Engineering Task Force (IETF) Request for Comment (RFC) 6749. An example of the authorization system 106 is a Pivotal User Account Authentication (UAA) Server module.

The authorization system 106 can authenticate requests by client applications on behalf of resource owners. For example, the authorization system 106 can establish a connection with the resource owner 102 by communicating with a user device 104 that hosts a user interface for proving proof of identity and access scope. The interface can provide an integrity- and confidentiality-protected communication channel that provides a secure environment for data verification between the resource owner 102 and the authorization system 106.

The authorization system 106 can verify that the user password credentials match those stored in the distributed computing system 101. For example, the resource owner 102 can be presented with a graphical user interface or a command line tool to enter password credentials. The authorization system 106 can then verify that the resource owner 102 has actual ownership of the set of resources being requested. For example, the authorization system 106 can maintain a log storing each user's resource access privileges. If either verification fails, the delegated authorization process terminates.

The authorization system 106 can ask resource owners to consent to the client application accessing critical or non-critical resources. The resource owner 102 can consent, deny, or selectively consent to the request.

Depending on the type of the resource being requested, the authorization system 106 can perform an additional verification step, e.g., a multi-factor authentication step. For example, the resources being requested can include critical resources hosted on the critical resource server 112, non-critical resources hosted on the non-critical resource server 110, or both. The authorization system 106 can retain the authority to designate each resource as critical or non-critical.

If the resource being requested is a critical resource, the authorization system 106 can prompt the resource owner 102 to authenticate with multi-factor credentials before granting delegated authorization to the client application 108. For example, multi-factor authentication can include first sending the resource owner 102 a one-time-valid time-sensitive passcode to multi-factor authentication devices 114, e.g., by email or text message. Or the authorization system can use an authentication application, e.g., Google authenticator, that generates a passcode for the resource owner. In some examples, the multi-factor authentication device can be the same device that hosts the user device 104. The resource owner 102 is then prompted to enter the passcode to the authorization system 106 via the user device 104.

If the authorization system 106 determines that the passcode is valid, it can provide delegated authorization to the client application 108. For example, the authorization system 106 can provide the client application 108 with an access token that includes information such as the scope of access, the resource, the client application ID, the valid time period, etc. The access token in this scenario will include the critical resources as valid scopes within the token.

Alternatively, if the resource being requested is a non-critical resource, the multi-factor authentication step can be omitted and the authorization system 106 can directly issue an access token to the client application 108. In this scenario, the client application 108 has delegated authorization to access only non-critical resources. The access token in this scenario will include the non-critical resources as valid scopes within the token.

Access to multiple resources can be requested within a single request. In the scenario where both critical and non-critical resources are requested, the user can selectively choose to consent to individual resources. If any critical resources apply, the multi-factor authentication step will not be omitted. If only non-critical resources apply, the multi-factor authentication step will be omitted. An access token will be issued containing only the list of resources that were consented to as scopes of the token. If no resources apply, the delegated authorization process terminates with no access token issued.

To access the requested resource, the client application 108 can pass the access token to the resource-hosting server, e.g., the non-critical resource server 110 or the critical resource server 112. The server hosting the resources can verify the access token. The server can do this by performing either offline validation with the authorization system 106 through a signature validation based upon a previously established trust with the authorization system 106, or by performing an online validation. Once the access token is verified, the server hosting the resources can check that the token is allowed to access the resources it contains based upon the scopes within the token. If the token contains the scopes corresponding to the server's protected resources, the server responds with the requested resources. If the token does not contain the scopes corresponding to the server's protected resources, the server will deny access to the requested resources.

Figure 2:
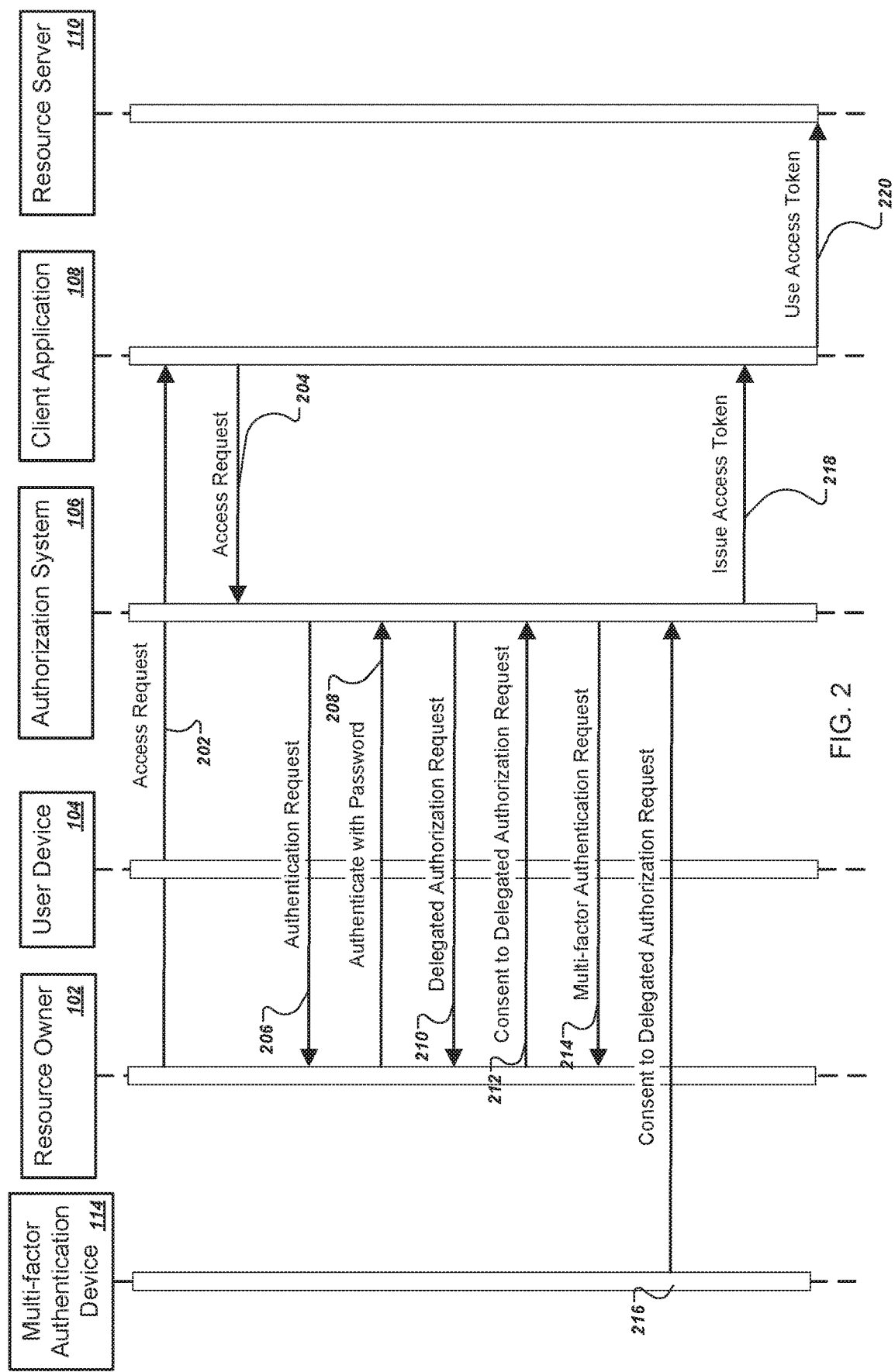
FIG. 2 is a schematic diagram of an example process performed in a distributed computing system.

FIG. 2 is a sequence diagram of an example process performed in a distributed computing system. FIG. 2 illustrates different steps performed by different components in the distributed computing system for delegated authorization. In FIG. 2, the vertical axis represents time, so the steps are performed in order from 202 to 220.

A resource owner 102 can first access a client application 108 (202). For example, the client application 108 can be a gaming application and the resource owner 102 attempts to start the game.

The client application 108 can be configured to request access to resources hosted a distributed computing system. Thus, the client application 108 sends, to the authorization system 106, a request to access certain resources of the resource owner (204).

In response, the authorization system 106 requests authentication from the resource owner 102 (206). For example, the authorization system 106 can verify that the client application 108 is indeed making the request on behalf of the resource owner 102. The authorization system 106 can communicate with the resource owner 102 using a user device 104, such as a web browser or a command line tool.

In response, the resource owner 102 sends a verification to the authorization system 106 via the user device 104 (208). For example, the resource owner 102 can verify its identity by using password credential.

In response, the authorization system 106 sends a delegated authorization request to the resource owner 102 via the user device 104 (210). The delegated authorization request can be in the form of a selectable list of resources which the client application 108 is attempting to access.

In response, the resource owner 102 selects which resources to be delegated to the client application 108 (212).

In some examples, the resource owner 102 can still access the client application 108 without granting all requested resources.

If one of the selected resources is a critical resource, the authorization system 106 sends a multi-factor authentication request to the resource owner 102 via the user device 104 (214). In some examples, the authorization system predetermines which resources are considered to be critical resources. The multi-factor authentication request requires an additional verification from the resource owner 102, e.g., by verifying with a passcode sent to a multi-factor authentication device 114 maintained by the resource owner 102.

In response, the resource owner 102 verifies the multi-factor authentication request by using the passcode received by the multi-factor authentication device (216). The resource owner can upload the passcode via the user device 104 within a limited time window.

If the multi-factor authentication succeeds, the authorization system 106 issues access token to the client application 108 (218). For example, an access token corresponds to a particular resource and will expire after a predefined period of time.

In the case where all of the selected resources are non-critical resources, the authorization system will omit the multi-factor authentication request to the resource owner 102 via the user device 104 (214) and the resource owner 102 will not verify the multi-factor authentication request by using the passcode received by the multi-factor authentication device (216).

After the resource server 110 verifies the access token, the client application 108 is allowed to access the requested resource.

With this general sequence of events in mind, two specific use cases will now be described.

First, the distributed computing system can be a system that hosts data for a retail store and the client application 108 can be a custom-built application designed by the retail entity which allows sales associates to access inventory and payment information from handheld devices. In this example, the resource owner 102 can be any retail store associate with access to the application. A non-critical resource hosted by the distributed system can be an inventory API that merely allows sales associates to look up whether or not certain items are in stock. A critical resource hosted by the distributed system can be a payment API that allows sales associates to look up past orders and payment information, e.g., credit card numbers, associated with previous orders. When the retail application attempts to obtain delegated authorization with access to the payment API, the authorization system will trigger the sequence of multi-factor authentication and the store associate will have to provide the multi-factor authentication credentials, e.g., by submitting a passcode generated by an authenticator application. On the other hand, if the retail application only attempts to obtain delegated authorization to access the inventory API, the authorization system can provide an access token without triggering multi-factor authentication.

In another example, the distributed computing system is a cloud application platform that hosts online applications and multi-factor authentication is used to prevent unauthorized users from modifying system resources. For example, the client application 108 can be an application manager program that manages application deployed in the cloud application platform. The critical resources can be files or APIs that provide the user with the ability to allocate and deallocate new resources in the system. The non-critical resources can be files or APIs that merely provide the user with read access to information about properties or attributes of the system. In this example, the application manager application can request delegated authorization in order to launch a new application on the platform. In this instance, launching the new application requires access to critical-resource APIs. Thus, the authorization system will trigger the sequence of multi-factor authentication, and the user of the application manager application will need to provide multi-factor authentication credentials in order to launch the new application. On the other hand, if the application manager only requested access to non-critical resources, the authorization system can provide an access token without triggering multi-factor authentication.

Figure 3:
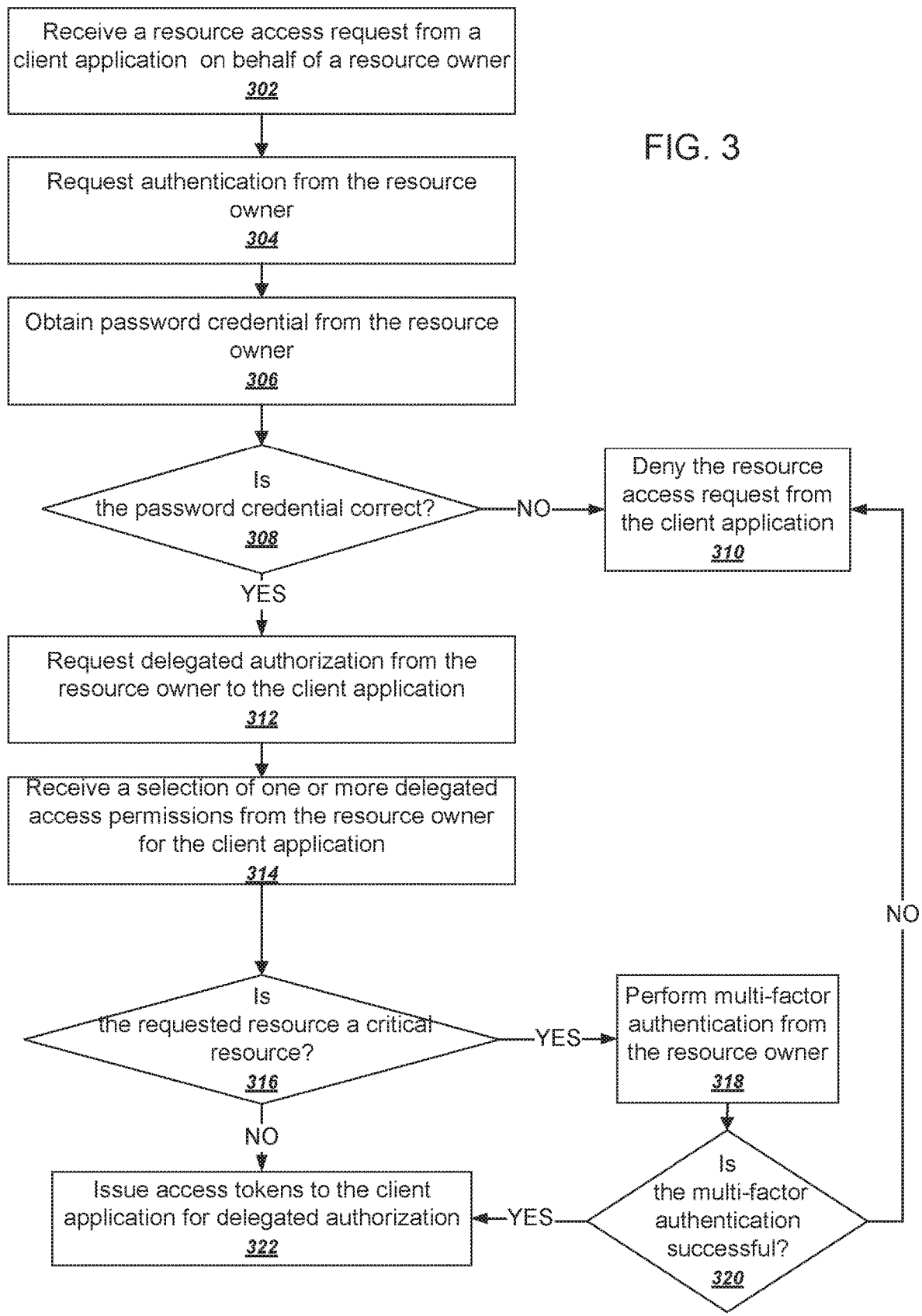
FIG. 3 is a flow chart of an example process performed in a distributed computing system.

FIG. 3 is a flow chart of an example process performed in a distributed computing system. The distributed computing system can be the distributed computing system 101 of FIG. 1.

The system receives resource access request from a client application on behalf of a resource owner (302). The request can be made to a specific component of the system, e.g., an authorization system of the distributed computing system. The resources can be one or more system resources hosted on one or more servers in the distributed computing system. For example, the resources can include computing system information, user information, system logs, application programming interfaces (APIs), etc. The resource owner is an entity in the distributed computing system with access to certain resources. For example, the resource owner can be an administrative account in the distributed computing system. The authorization system can be a system that implements a delegated authorization security model, e.g., an OAuth 2.0 provider, in the distributed computing system. An example of the authorization system is the authorization system 106 in FIG. 1.

As part of the delegated authorization security model, the client application does not directly interact with the resource owner, but instead sends the access request to the authorization system. This separation can provide many security benefits. For example, the client application will not directly obtain the resource owner's system credentials.

The system requests authentication from the resource owner (304). For example, the request can be sent via a secured communication channel, such as the user device 104 in FIG. 1. The authentication verifies (1) the identity of the resource owner, and (2) the legitimacy of the request.

The system obtains password credential from the resource owner (306). After proving the identity of the resource owner, e.g., by matching the provided password credentials with stored credentials, the authorization system can verify that the client application is requesting access on behalf of the user. If the password credential is incorrect, the system denies the resource request from the client application (310). The authorization system can check if the resource owner has access to the requested resources. For example, the authorization system can keep a log of access privilege for all users in the system. If the request attempts to access resources outside the privilege scope of the resource owner, the authorization system can terminate the request.

The system requests delegated authorization from the resource owner to the client application (312). For example, the resource owner can be provided with a list of selectable resources which the client application attempts to access. The resource owner can choose to grant access to some or all of the resources. The consents can be communicated on a secured communication channel, e.g., the user device 104 of FIG. 1.

The system receives a selection of one or more delegated access permissions from the resource owner for the client application (314).

In some cases, the resources can be designated as critical resources or non-critical resources. For example, critical resources can be resources that are critical to the system or users and receive a heightened level of security. The system, using the authorization system, can abstract the designations from the resource hosting servers and categorize each resource as critical or non-critical based on predefined rules. Multi-factor authentication is typically mandated by policy for resources categorized as critical.

If the authorization system determines that the one or more requested resource include a critical resource, the system performs multi-factor authentication from the resource owner (318). For example, the authorization system can provide a selectable list of resources to the resource owner for consent, and a selection of a critical resource can trigger multi-factor authentication. For example, the authorization system can send a passcode to the resource owner using a number of predefined communication channels, such as email, text message, Google Authenticator message, etc. The resource owner has to submit the passcode back to the authorization system within a time window, e.g., through the secured communication channel, to authenticate the multi-factor credentials of the resource owner, providing additional evidence that the client application requesting the critical resource has been authorized by the resource owner to access the critical resource on their behalf.

If the multi-factor authentication succeeds, or if the requested resource does not include critical resources, the system issues an access token to the client application for delegated authorization (322). An access token can be a string representing an authorization issued to a client application. The access token can be opaque to the client application, and represent specific scopes, lifetime, and other access attributes. The access token can have different formats, structures, and methods of utilization based on the resource hosting servers' requirements. A single authorization system can issue access tokens accepted by multiple resource hosting servers, and each resource hosting server can enforce the authorization by accepting the access token.

The client application can access the requested resource by presenting the corresponding access token to the resource hosting server, e.g., the critical resource server 112 or the non-critical resource server 110 of FIG. 1. The resource hosting server can validate the access token to ensure that it has not expired and that its scopes cover the requested resource. The method in which the client application utilizes the access token to authenticate with the resource server depends on the specific format of the access token issued. In some cases, the access token is only valid for one access request. For example, the access token will be destroyed after the client application accesses the requested resource. In other cases, the access token will be persisted for use across resource servers, and will be persisted for the lifetime of the token as specified by security policies of the administrators of the authorization system. Additionally, some resource servers may use the same access token to perform subsequent resource requests to other resource servers, limited to the original resources that the resource owner consented to before the token was issued.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In addition to the embodiments described above, the following embodiments are also innovative:

Embodiment 1 is a method comprising: maintaining, by a distributed resource system of one or more computers, one or more resources associated with a resource owner; receiving, by an authentication system executing on one or more computers, an access request from a client application, wherein the access request requests access by the client application to one of the one or more resources; performing, by the authentication system, a first authentication of the resource owner; determining that the first authentication was successful; in response to determining that the first authentication being successful, providing, to the resource owner by the authentication system, a request to delegate access to the one or more resources to the client application; receiving, from the resource owner, a selection of one or more delegated access permissions for the one or more resources to be delegated to the client application; determining, by the authentication system, that at least one of the one or more delegated access permissions is for a critical resource; in response to determining that at least one of the one or more delegated access permissions is for a critical resource, performing, by the authorization system, a second authentication by requesting multi-factor credentials from the resource owner and authenticating the multi-factor credentials; determining that the second authentication was successful; and in response to determining that the second authentication being successful, granting, by the authorization system, an access token to the client application, wherein the access token permits the client application to access the critical resource on the resource system.

Embodiment 2 is the method of embodiment 1, wherein the authentication system designates each resource as a critical resource or a non-critical resource.

Embodiment 3 is the method of any one of embodiments 1 to 2, wherein the request to delegate access to the one or more resources to the client application comprises providing, by the authorization system, a selectable list of resources to the resource owner, and wherein a selection of a critical resource causes the authorization system to perform a multi-factor authentication with the resource owner.

Embodiment 4 is the method of any one of embodiments 1 to 3, further comprising receiving, by the resource system, a request by the client application to access the critical resource, wherein the request specifies the access token; verifying, by the resource system, delegated authentication of the client application based on the access token; and providing, by the resource system to the client application, the requested resources.

Embodiment 5 is the computer-implemented method of any one of embodiments 1 to 4, wherein the access token is destroyed after the client application accesses the requested resources.

Embodiment 6 is the method of any one of embodiments 1 to 5, wherein the access token persists after the application accesses the requested resources.

Embodiment 7 is the method of any one of embodiments 1 to 6, wherein the one or more resources include one or more application programming interfaces (APIs).

Embodiment 8 is the method of any one of embodiments 1 to 7, further comprising in response to determining that none of the delegated access is for a critical resource, bypassing the second authentication.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    maintaining, by a distributed resource system of one or more computers, a plurality of resources associated with a resource owner, wherein some of the plurality of resources are designated by the resource owner to be critical resources and some of the plurality of resources are designated by the resource owner to be noncritical resources;
    receiving, by an authorization system executing on one or more computers, an access request from a client application, wherein the access request requests access by the client application to one of the plurality of resources;
    performing, by the authorization system, a first authentication of the resource owner;
    determining that the first authentication was successful;
    in response to determining that the first authentication was successful, providing, to the resource owner by the authorization system, a selectable list of resources associated with the resource owner;
    receiving, by the authorization system from the resource owner, a first delegation request to delegate, to the client application, access to one or more first selected resources among the selectable list of resources associated with the resource owner, wherein the first delegation request comprises a first selection of one or more delegated access permissions for the one or more first selected resources;
    evaluating, by the authorization system, resource-specific designations made by the resource owner to determine whether any of the first selection of one or more delegated access permissions is for a resource designated as a critical resource by the resource owner;
    determining that none of the first selection of one or more delegated access permissions are for a resource designated as a critical resource by the resource owner;
    in response, bypassing multi-factor authentication for the resource owner;
    receiving, by the authorization system from the resource owner, a second delegation request to delegate, to the client application, access to one or more second selected resources among the resources associated with the resource owner, wherein the second delegation request comprises a second selection of one or more delegated access permissions for the one or more second selected resources;
    if and only if at least one of the second selection of one or more delegated access permissions is for a resource designated as a critical resource by the resource owner, performing multi-factor authentication for the resource owner before issuing a first access token to the client application, comprising:
    performing, by the authorization system, a second authentication by requesting multi-factor credentials from the resource owner and authenticating the multi-factor credentials;
    determining that the second authentication was successful; and
    in response to determining that the second authentication was successful, granting, by the authorization system, the first access token permitting the client application to access the one or more second selected resources on the resource system as designated by the resource owner, wherein the first access token includes access scopes covering some or all of the critical resources on the resource system.

2. The computer-implemented method of claim 1, wherein the authorization system designates each resource as a critical resource or a non-critical resource.

3. The computer-implemented method of claim 1, further comprising:
    receiving, by the resource system, a request by the client application to access a critical resource, wherein the request specifies the access token;
    verifying, by the resource system, delegated authentication of the client application based on the first access token; and
    providing, by the resource system to the client application, the requested resources.

4. The computer-implemented method of claim 3, wherein the access token is destroyed after the client application accesses the requested resources.

5. The computer-implemented method of claim 3, wherein the access token persists after the client application accesses the requested resources.

6. The computer-implemented method of claim 1, wherein the one or more resources include one or more application programming interfaces (APIs).

7. A system comprising:
one or more computers and one or more storage devices storing instructions that when executed by the one or more computers cause the one or more computers to perform operations comprising:
maintaining, by a distributed resource system of one or more computers, a plurality of resources associated with a resource owner, wherein some of the plurality of resources are designated by the resource owner to be critical resources and some of the plurality of resources are designated by the resource owner to be noncritical resources;
receiving, by an authorization system configured to execute on one or more computers, an access request from a client application, wherein the access request requests access by the client application to one of the plurality of resources;
performing, by the authorization system, a first authentication of the resource owner;
determining that the first authentication was successful;
in response to determining that the first authentication was successful, providing, to the resource owner by the authorization system, a selectable list of resources associated with the resource owner;
receiving, by the authorization system from the resource owner, a first delegation request to delegate, to the client application, access to the one or more first selected resources among the selectable list of resources associated with the resource owner, wherein the first delegation request comprises a first selection of one or more delegated access permissions for the one or more first selected resources;
evaluating, by the authorization system, resource-specific designations made by the resource owner to determine whether any of the first selection of one or more delegated access permissions is for a resource designated as a critical resource by the resource owner;
determining that none of the first selection of one or more delegated access permissions are for a resource designated as a critical resource by the resource owner;
in response, bypassing multi-factor authentication for the resource owner;
receiving, by the authorization system from the resource owner, a second delegation request to delegate, to the client application, access to one or more second selected resources among the resources associated with the resource owner, wherein the second delegation request comprises a second selection of one or more delegated access permissions for the one or more second selected resources;
if and only if at least one of the second selection of one or more delegated access permissions is for a resource designated as a critical resource by the resource owner, performing multi-factor authentication for the resource owner before issuing a first access token to the client application, comprising:
performing, by the authorization system, a second authentication by requesting multi-factor credentials from the resource owner and authenticating the multi-factor credentials;
determining that the second authentication was successful; and
in response to determining that the second authentication was successful, granting, by the authorization system, the first access token permitting the client application to access the one or more second selected resources on the resource system as designated by the resource owner, wherein the first access token includes access scopes covering some or all of the critical resources on the resource system.

8. The system of claim 7, wherein the authorization system designates each resource as a critical resource or a non-critical resource.

9. The system of claim 7, wherein the operations further comprise:
receiving, by the resource system, a request by the client application to access a critical resource, wherein the request specifies the access token;
verifying, by the resource system, delegated authentication of the client application based on the first access token; and
providing, by the resource system to the client application, the requested resources.

10. The system of claim 9, wherein the access token is destroyed after the client application accesses the requested resources.

11. The system of claim 9, wherein the access token persists after the client application accesses the requested resources.

12. The system of claim 7, wherein the one or more resources include one or more Application Programming Interfaces (APIs).

13. One or more non-transitory computer storage media encoded with a computer program, the computer program storing instructions that when executed by one or more computers cause the one or more computers to perform operations comprising:
maintaining, by a distributed resource system of one or more computers, a plurality of resources associated with a resource owner, wherein some of the plurality of resources are designated by the resource owner to be critical resources and some of the plurality of resources are designated by the resource owner to be noncritical resources;
receiving, by an authorization system configured to execute on one or more computers, an access request from a client application, wherein the access request requests access by the client application to one of the plurality of resources;
performing, by the authorization system, a first authentication of the resource owner;
determining that the first authentication was successful;
in response to determining that the first authentication was successful, providing, to the resource owner by the authorization system, a selectable list of resources associated with the resource owner;
receiving, by the authorization system from the resource owner, a first delegation request to delegate, to the client application, access to one or more first selected resources amonq the selectable list of resources associated with the resource owner, wherein the first delegation request comprises a first selection of one or more delegated access permissions for the one or more first selected resources;

evaluating, by the authorization system, resource-specific designations made by the resource owner to determine whether any of the first selection of one or more delegated access permissions is for a resource designated as a critical resource by the resource owner;

determining that none of the first selection of one or more delegated access permissions are for a resource designated as a critical resource by the resource owner;

in response, bypassing multi-factor authentication for the resource owner;

receiving, by the authorization system from the resource owner, a second delegation request to delegate, to the client application, access to one or more second selected resources among the resources associated with the resource owner, wherein the second delegation request comprises a second selection of one or more delegated access permissions for the one or more second selected resources;

if and only if at least one of the second selection of one or more delegated access permissions is for a resource designated as a critical resource by the resource owner, performing multi-factor authentication for the resource owner before issuing a first access token to the client application, comprising:

performing, by the authorization system, a second authentication by requesting multi-factor credentials from the resource owner and authenticating the multi-factor credentials;

determining that the second authentication was successful; and in response to determining that the second authentication was successful, granting, by the authorization system, the first access token permitting the client application to access the one or more second selected resources on the resource system as designated by the resource owner, wherein the first access token includes access scopes covering some or all of the critical resources on the resource system.

14. The one or more non-transitory computer storage media of claim 13, wherein the authorization system designates each resource as a critical resource or a non-critical resource.

15. The one or more non-transitory computer storage media of claim 13, wherein the operations further comprise:

receiving, by the resource system, a request by the client application to access a critical resource, wherein the request specifies the access token;

verifying, by the resource system, delegated authentication of the client application based on the first access token; and providing, by the resource system to the client application, the requested resources.

16. The system of claim 7, wherein:

the distributed computing system is a cloud application platform that hosts user-provided applications;

the client application is configured to manage deployment of workloads on the cloud application platform;

the non-critical resources comprise services that when executed provide access to workloads hosted on the cloud application platform; and the critical resources comprise underlying computing resources of the cloud application platform.

* * * * *